(12) United States Patent
Choi et al.

(10) Patent No.: US 10,286,829 B2
(45) Date of Patent: May 14, 2019

(54) GULL WING DOOR-TYPE DANGEROUS ARTICLE STORAGE APPARATUS

(71) Applicant: SEKI ARKEMA CO., LTD., Gyeongsangnam-do (KR)

(72) Inventors: Chan Uk Choi, Gyeongsangnam-do (KR); Ui Chang Kim, Gyeongsangnam-do (KR)

(73) Assignee: SEKI ARKEMA CO., LTD., Gyeongsan Gnam-Do (KR)

( * ) Notice: Subject to any disclaimer, the term of this patent is extended or adjusted under 35 U.S.C. 154(b) by 0 days.

(21) Appl. No.: 15/577,328

(22) PCT Filed: Feb. 26, 2016

(86) PCT No.: PCT/KR2016/001902
§ 371 (c)(1),
(2) Date: Nov. 27, 2017

(87) PCT Pub. No.: WO2016/200014
PCT Pub. Date: Dec. 15, 2016

(65) Prior Publication Data
US 2018/0147974 A1 May 31, 2018

(30) Foreign Application Priority Data

Jun. 11, 2015 (KR) .................. 20-2015-0003777 U

(51) Int. Cl.
*B60P 7/08* (2006.01)
*B62D 33/04* (2006.01)
(Continued)

(52) U.S. Cl.
CPC ............... *B60P 7/08* (2013.01); *B60J 5/0473* (2013.01); *B60J 5/0486* (2013.01); *B60P 3/20* (2013.01);
(Continued)

(58) Field of Classification Search
CPC .......... B60J 5/0473; B60J 5/0486; B60P 3/20; B60P 3/205; B60P 7/06; B60P 7/08;
(Continued)

(56) References Cited

U.S. PATENT DOCUMENTS 3,062,157 A * 11/1962 Woods ...................... B60P 7/06
410/149
6,247,747 B1 * 6/2001 Kawanomoto ........ B60J 5/0498
296/181.3
(Continued)

FOREIGN PATENT DOCUMENTS

JP 10-100944 A 4/1998
KR 200203996 Y1 11/2000
(Continued)

OTHER PUBLICATIONS

English translation of Gold Van (KR 20-0339939); retreived on Oct. 29, 2018 via KIPRIS located at http://engportal.kipris.or.kr/engportal/search/total_search.do. (Year: 2018).*
(Continued)

*Primary Examiner* — Jason S Daniels
(74) *Attorney, Agent, or Firm* — Loza & Loza, LLP; Heidi L. Eisenhut

(57) ABSTRACT

A gull wing door-type hazardous material container system allowing for easy loading and unloading of intermediate bulk containers is provided. The container system minimizes a loss of cold air fully filling the inside for safe work when only some of a plurality of intermediate bulk containers is selectively loaded. The container system includes a body that has a loading space to load airtight containers containing hazardous material and is opened at both sides and a pair of gull wing doors independently operated to open/close both sides of the body. Additionally, the system includes a partition plate longitudinally disposed in the body and divides the loading space into independent spaces of first (Continued)

and second loading spaces respectively. Cooling units are disposed in the first and second loading spaces, respectively, to independently supply cold air, in which the first and second loading spaces can be independently sealed by the gull wing doors.

3 Claims, 7 Drawing Sheets

(51) Int. Cl.
  *B60P 3/20* (2006.01)
  *B60P 7/02* (2006.01)
  *B60J 5/04* (2006.01)
  *B60P 3/22* (2006.01)
(52) U.S. Cl.
  CPC ............ *B60P 3/205* (2013.01); *B60P 3/2295* (2013.01); *B60P 7/02* (2013.01); *B62D 33/048* (2013.01)
(58) Field of Classification Search
  CPC ..... B60P 7/0815; B62D 33/04; B62D 33/042; B62D 33/048

USPC ...................................................... 296/182.1
See application file for complete search history.

(56) References Cited

U.S. PATENT DOCUMENTS

| | | | |
|---|---|---|---|
| 6,453,827 B1* | 9/2002 | Perazzo | B65D 19/0012 108/51.3 |
| 2010/0183398 A1* | 7/2010 | Nelson | B60P 3/205 410/129 |
| 2017/0210194 A1* | 7/2017 | Ling | B60R 16/04 |

FOREIGN PATENT DOCUMENTS

| | | |
|---|---|---|
| KR | 200339939 Y1 | 1/2004 |
| KR | 100815622 B1 | 3/2007 |
| KR | 10-0943280 B1 | 2/2010 |

OTHER PUBLICATIONS

PCT/KR2016/001902. Int'l Search Report & Written Opinion (dated May 31, 2016).

* cited by examiner

GULL WING DOOR-TYPE DANGEROUS ARTICLE STORAGE APPARATUS

TECHNICAL FIELD

The present invention relates to a gull wing door-type hazardous material container system, more particularly, to a gull wing door-type hazardous material container system that allows for easy loading and unloading of intermediate bulk containers and of which the internal temperature is easily controlled.

BACKGROUND ART

In general, hazardous materials are put in IBCs (intermediate bulk container), loaded in a container system, and then transported to destinations. Such a container system is formed in a container shape having an internal loading space and is carried on transportation vehicles or is integrally formed on the rear part of transportation vehicles.

In various hazardous materials, the hazardous materials that have to be maintained under specific temperature, such as organic peroxides, are loaded in container systems without contact with air by IBCs, and separate cooling units are provided in the container systems to maintain the organic peroxides at predetermined temperatures by continuously supplying cold air.

Organic peroxides, which are dangerous substances having flammable, water-reactive, spontaneous combustible, and self-heating properties, should be maintained under −20° C. as they explode when the temperature increases. Accordingly, it is very important to maintain temperature and it is required to maintain the temperature at a predetermined level when transporting organic peroxides on a transportation vehicle to other places.

A common transportation vehicle for transporting organic peroxides is shown in FIG. 1. The common transportation vehicle for transporting hazardous materials has a pair of main doors 2 that open in opposite directions at the rear end of a container system 1, and in some cases, it has a small sub-door 3 on a side.

Since this type of container system 1 has only the main doors 2 and the sub-door 3 for closing the loading space to prevent a loss of cold air, it is highly effective in keeping cold air, but it is impossible to load large cargoes and even small cargoes should be sequentially loaded from the front to the rear. Accordingly, it takes very long time to load cargoes and it is difficult to secure a visual field.

Further, it is impossible to selectively unload the cargoes at the front part and it is required to unload all the cargoes at the rear part in order to unload the cargoes at the front part, so working time is increased and a large amount of cold air is lost. Further, organic peroxides are exposed to the outside, the temperature increases, and the possibility of explosion increases.

In order to solve this problem, a "Refrigerated wing body transportation vehicle (Korean Patent No. 10-0815622)" has been disclosed in the related art.

The conventional refrigerated wing body transportation vehicle has a packing part capable of maintaining a seal at the joints of each gate and wings and insulating the outer sides as a freezer transportation vehicle, thus capable of carrying various items of freight.

However, according to the refrigerated wing body transportation vehicle, when gull wing doors are opened to unload cargoes, cold air uniformly filled in the entire loading space rapidly flows outside, so the cooling efficiency is quickly decreased.

In particular during summer, when the gull wing doors are opened to unload some of cargoes, the whole cold air fully filled in the loading space flows outside and the temperature of the loading space rapidly increases. Accordingly, it takes long time to fill the entire loading space with cold air after closing the gull wing doors.

SUMMARY OF INVENTION

Technical Problem

An object of the present invention is to provide a gull wing door-type hazardous material container system that allows for easy loading and unloading of intermediate bulk containers, and minimizes a loss of cold air fully filled inside for safe work when only some of a plurality of intermediate bulk containers is selectively unloaded.

Solution to Problem

In order to achieve the object, a gull wing door-type hazardous material container system according to the present invention includes: a body that has a loading space therein to load airtight containers keeping a hazardous material and is opened at both sides; a pair of gull wing doors that is independently operated to open/close both sides of the body; a partition plate that is longitudinally provided in the body and divides the loading space into independent spaces of a first loading space and a second loading space; and cooling units that are provided in the first loading space and the second loading space, respectively, to independently supply cold air, in which the first loading space and the second loading space can be independently sealed by the gull wing doors.

The cooling units may supply cold air either from the front upper portion or the rear upper portion of the body.

A sub-door that can be opened/closed is provided at the partition plate.

Securing arrangements that restrict the movement of the airtight containers may be provided in the first loading space and the second loading space.

The securing arrangements each may include: a plurality of first fixing grooves formed with predetermined gaps at the upper portion of the partition plate in the longitudinal direction; a plurality of second fixing grooves formed at the outer portion of the bottom of the body with predetermined gaps in the longitudinal direction; and a tension member having an adjustable length, having hooks at both ends to be inserted in the first fixing grooves and the second fixing grooves, respectively, and restricting movement of the airtight container in the width direction of the body.

The securing arrangements each may include: a plurality of third fixing grooves formed with predetermined gaps at the lower portion of the partition plate in the longitudinal direction; and support members having locking projections on surfaces perpendicular to each other to be inserted in the second fixing grooves and the third fixing grooves, and restricting movement of the airtight container in the longitudinal direction of the body.

Advantageous Effects of Invention

The present invention has various effects, as follows.

First, since the loading space where IBCs (intermediate bulk container) are loaded is divided into independent spaces of first loading space and second loading space such that the loading spaces can be independently opened/closed, it is easy to control temperature, so safe work is possible.

Second, since a pair of gull wing doors that can be independently opened/closed is provided, it is easy to load and unload cargoes.

Third, since the independent first and second loading spaces can be opened/closed by each gull wing doors, when only some of a plurality of IBCs is loaded or unloaded, the temperature of the loading spaces at the opposite side is maintained without changing.

Fourth, since one loading space is divided into two independent loading spaces and a cooling unit is provided in each of the loading spaces, it is possible to independently control temperature, and it is also possible to quickly fill cold air in the loading spaces even after loading or unloading IBCs in or from any one of the loading spaces.

Fifth, since it is possible to load a plurality of IBCs and there are provided securing arrangements, it is possible to prevent the IBCs from moving forward/backward and left/right due to vibration etc.

Sixth, since a sub-door is separately formed at the partition plate, a worker can easily move between the first loading space and the second loading space, so the worker can efficiently work.

DESCRIPTION OF EMBODIMENTS

Figure 1:
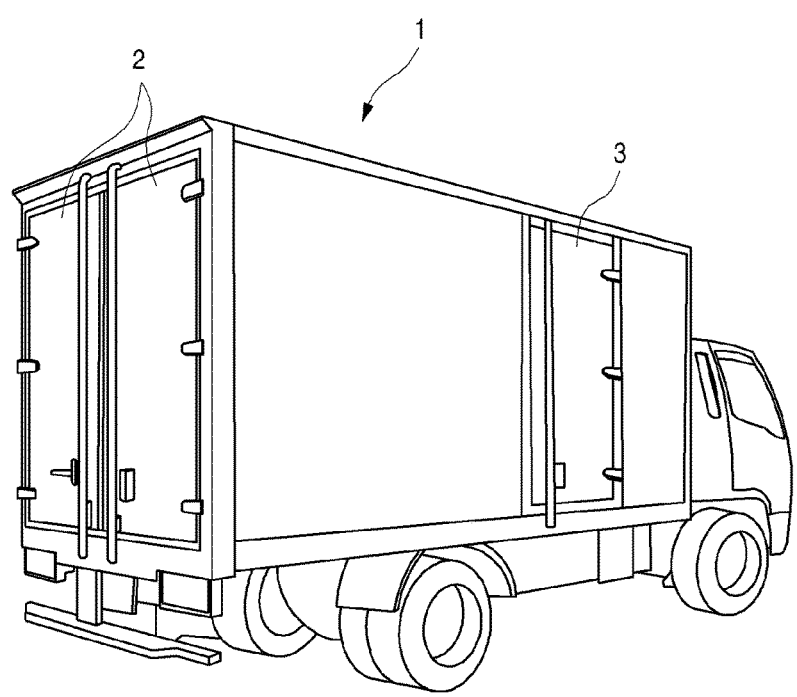
FIG. 1 is a view showing a common transportation vehicle for transporting organic peroxides in the related art.

An embodiment of the present invention is described hereafter with reference to the accompanying drawings and the reference numerals used in the background art and the configuration described above are applied in the same way, if not specifically stated.

The following description for a gull wing door-type hazardous material container system of the present invention is a preferred embodiment of the present invention, and the present invention is not limited thereto and may be implemented in various ways.

Further, the shapes and sizes of components to be described below are only examples and not limited thereto, and they can be changed in various ways as long as the same effects can be achieved.

Although it is exemplified that a hazardous material container system 1 having gull wing doors 300 according to an embodiment of the present invention is integrally formed on the rear part of a transportation vehicle 10, the transportation vehicle 10 is only an example to which the present invention is applied and the present invention may be formed separately from the transportation vehicle 10. In this case, the container system can be combined with the vehicle 10, if necessary.

Figure 2:
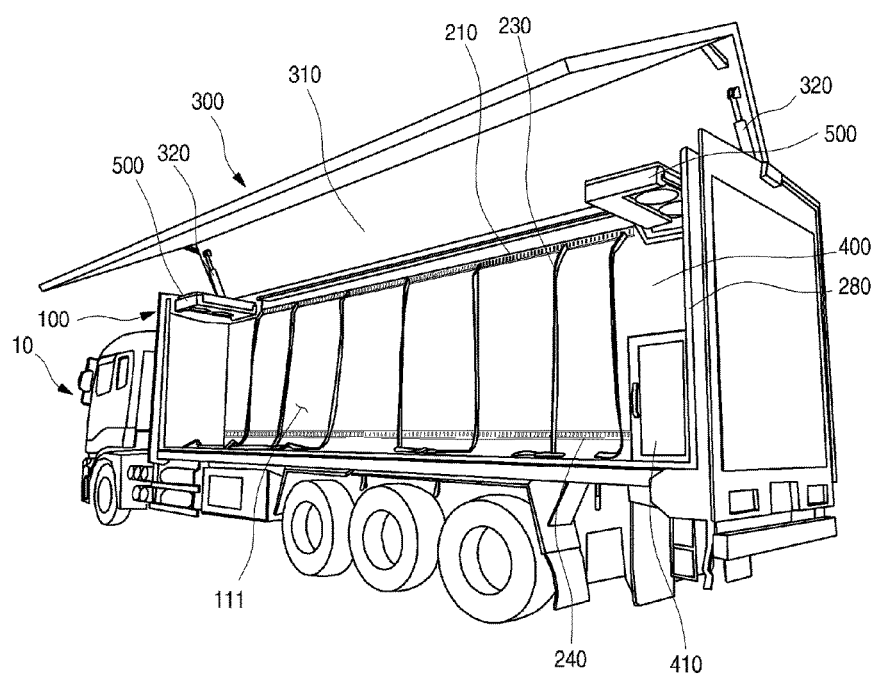
FIG. 2 is a view showing the inside of a first loading space of a gull wing door-type hazardous material container system according to the present invention.
Figure 3:
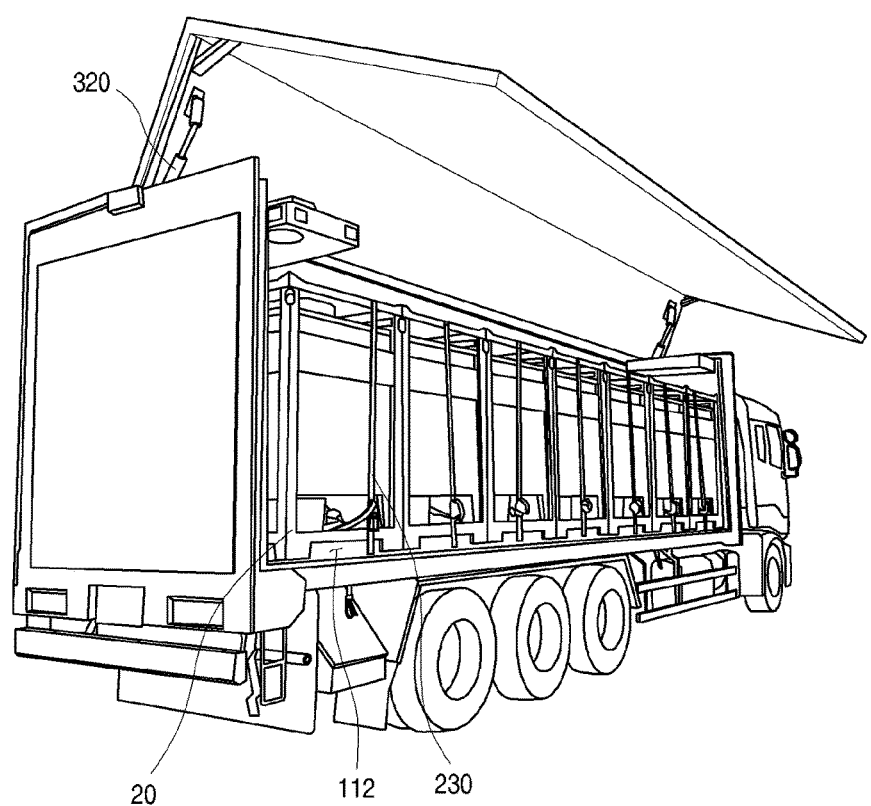
FIG. 3 is a view showing the inside of a second loading space of the gull wing door-type hazardous material container system according to the present invention.

As shown in FIGS. 2 and 3, the gull wing door-type hazardous material container system 1 according to an embodiment of the present invention includes a body 100 to safely keep and transport organic peroxides (hereafter, referred to as "hazardous materials"), a pair of gull wing doors 300, a partition plate 400, and cooling units 500.

The body 100 has a rectangular shape to be mounted and carried on the transportation vehicle 10 and has loading spaces 111 and 112 therein to load one or more IBCs (intermediate bulk container, hereafter, referred to as 'airtight containers 20') keeping a hazardous material.

The body 100 is opened at both sides so that the airtight containers 20 can be loaded and unloaded, is closed at the front and rear sides, and is opened at the top so that a pair of gull wing doors 300 to be described below can be mounted. A mini door may be provided on the front and rear sides of the body 100, if necessary.

In general container systems, both sides are closed and the rear side can be opened, but in the body 100 according to the present invention, both sides are opened, so it is possible to load and unload the airtight containers 20 regardless of the order and it is also possible to stack airtight containers 20 having various sizes.

A pair of gull wing doors 300 is provided to independently open/close both open sides of the body 100 and is formed in an L-shape.

The gull wing doors 300 have one end hinged to the center of the top of the body 100 to rotate in opposite directions and the other end that is brought in contact with or separated from a sealing member 280 to be described below, depending on operation of the gull wing doors 300.

Actuating cylinders 320 for opening/closing the gull wing doors 300 are provided at the front and rear portion on the top of the body 100 and the gull wing doors 300 are opened upward over the body 100 in an inversed W-shape by the actuating cylinders 320.

One end of the gull wing doors 300 are hermetically sealed by the top of the partition plate 400 to be described below and the sealing member 280, so when the gull wing doors 300 are closed, cold air supplied in the first and second loading spaces 111 and 112 cannot leak to the outside, and the first loading space 111 and the second loading space 112, which will be described below, are maintained as independent spaces.

An operation unit that can separately open/close the gull wing doors 300 is separately provided on one side of the body 100, so the plurality of actuating cylinders 320 are independently operated. When the body 100 is integrated with the transportation vehicle 10, the operation unit may be provided at the driver seat of the transportation vehicle 10.

The sealing member 280 is disposed at all contact portions between the gull wing doors 300 and the body 100, so when the loading spaces 111 and 112 are closed, the cold air supplied in the spaces cannot leak to the outside.

Figure 4:
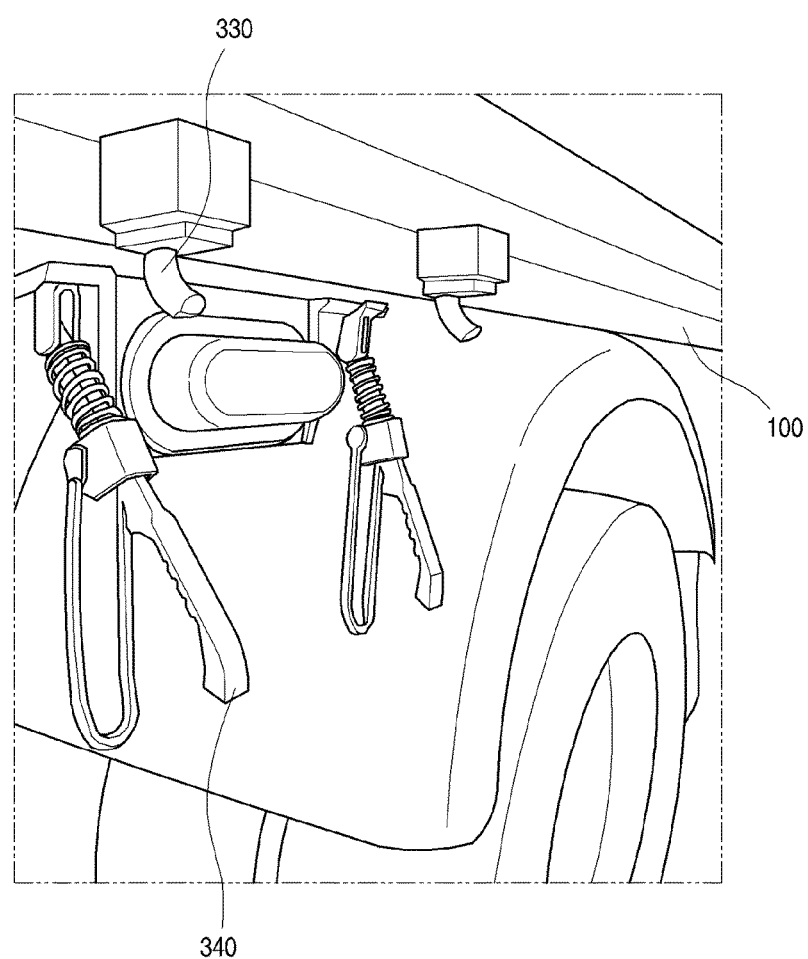
FIG. 4 is a view showing locking hooks and locking rings according to the present invention.

As shown in FIG. 4, a plurality of locking hooks 330 is formed at the lower portions of the gull wing doors 300 and locking rings 340 that are locked to the locking hooks 330 are formed at the lower portion of the body 100.

When a worker locks the locking rings 340 to the locking hooks 330 with the gull wing doors 300 closed, the gull wing doors 300 and the sealing member 280 are more strongly pressed to each other, thereby maximizing the sealing effect for preventing leakage of cold air.

The locking hooks 300 and the locking rings 340 may be switched as long as the same effect can be achieved, and they may be substituted by other types of locking mechanism.

The partition plate 400 is formed in a rectangular shape, is disposed inside the body 100, and separates the loading spaces 111 and 112, where the airtight containers 20 are loaded, into independent spaces of a first loading space 111 and a second loading space 112 in contact with the front and rear sides and the bottom of the body 100.

That is, the airtight containers 20 are independently loaded in the first loading space 111 and the second loading space 112 formed at both sides of the partition plate 400, and the first loading space 111 and the second loading space 112 are isolated from each other by the partition plate 400 such that flow of cold air is not shared.

This is different from the general container system 1. That is, according to the container system 1 of the related art, when a door is opened, the cold air fully filled in loading spaces 111 and 112 all flows to the outside, so it takes long time to fully fill the loading spaces with cold air even through closing the door after unloading only some of airtight containers 20, and thus, a hazardous materials may explode. Further, even while some of airtight containers 20 are being unloaded, the airtight containers 20 may rapidly increase in temperature, whereby they may explode.

However, according to the structure of the present invention, even though one of the first loading space 111 and the second loading space 112 is opened, the cold air fully filled in the other loading space does not flow outside, so it is possible to prevent the hazardous material in the other loading space from being exposed to the external temperature. Accordingly, it is possible to prevent a rapid increase of the internal temperature of the loading spaces 111 and 112, whereby it is possible to safely keep and load hazardous materials.

Further, even when the gull wing doors 300 are closed after only some of airtight containers 20 are unloaded, it takes a relatively short time to fully fill the loading spaces with cold air.

It is most preferable that the partition plate of the present invention isolates the first loading space 111 and the second loading space 112 such that cold air is not shared, but if necessary, a small space may be formed to share some of cold air.

The partition plate 400 may be provided with one or more sub-doors 410 to be able to open/close, so that a worker may easily move between the first loading space 111 and the second loading space 112, and the first loading space 111 and the second loading space 112 may be selectively connected.

Since the sub-door 410 is provided, a worker can quickly move when moving from the first loading space 111 to the second loading space 112 only by opening the sub-door 410 without needing to move down to the ground. Further, when the temperature of any one of the first loading space 111 and the second loading space 112 is increased during loading and unloading, the worker can open the sub-door 410 so that cold air can be supplied to both loading spaces, whereby cold air can be more quickly supplied to both loading spaces.

Accordingly, the sub-door 410 may be manually opened/closed by a worker or may be automatically opened/closed through a separate operation unit.

The cooling units 500 independently supply cold air to the first loading space 111 and the second loading space 112. Although the cooling units 500 are independently provided for the first loading space 111 and the second loading space 112 in an embodiment of the present invention, it may be possible to supply cold air from the inner sides of the body 100 to hide the cooling units, depending on circumstances.

Since cold air has a tendency to flow down, it is preferable to install the cooling units 500 at high positions to supply cold air to the first loading space 111 and the second loading space 112 from above them in consideration of this characteristic of cold air so that the temperature of hazardous materials can be effectively maintained. Accordingly, the cooling units may be disposed at front and rear upper portions for uniform cooling, and if necessary, they may be disposed at the center.

The airtight containers 20 loaded in the first loading space 111 and the second loading space 112 may be moved by vibration and inertia during transportation, so the airtight containers 20 may be deformed or damaged and the hazardous material may explode.

Figure 5:
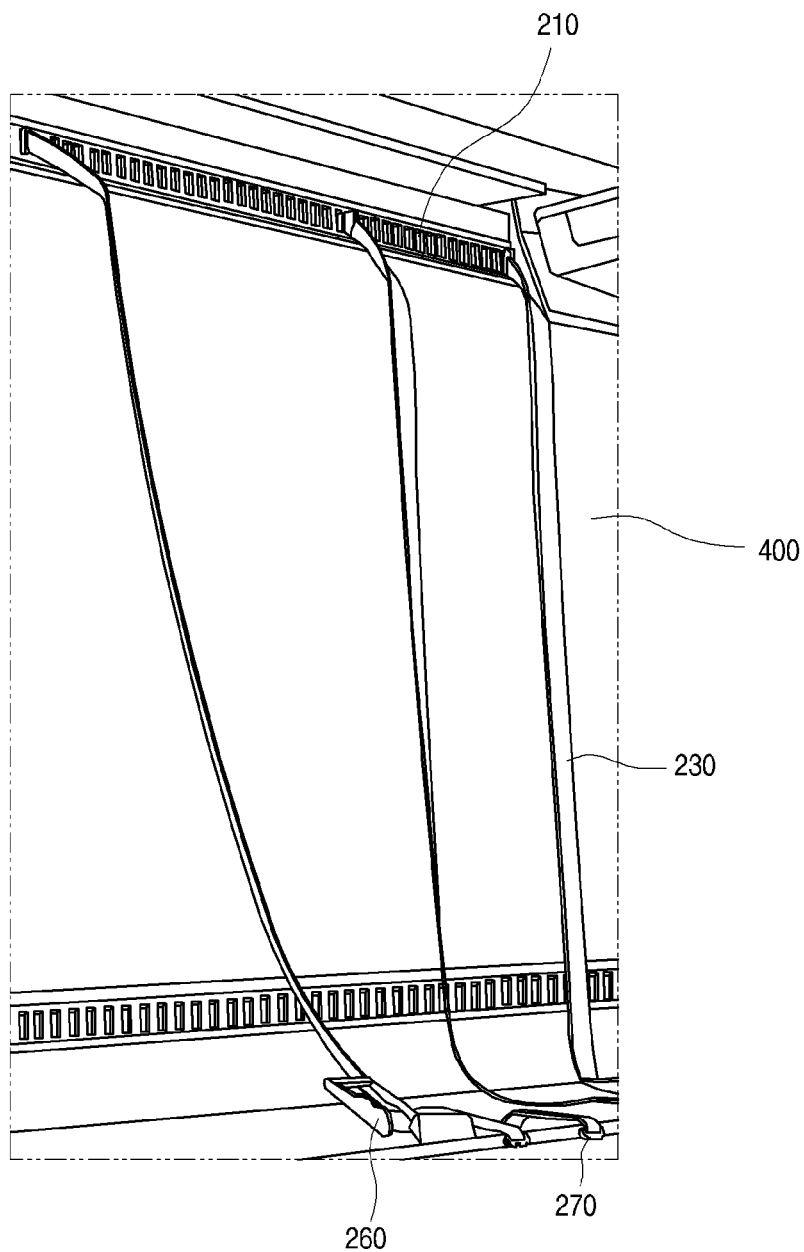
FIGS. 5 and 6 are views showing a securing arrangement according to the present invention.
Figure 6:
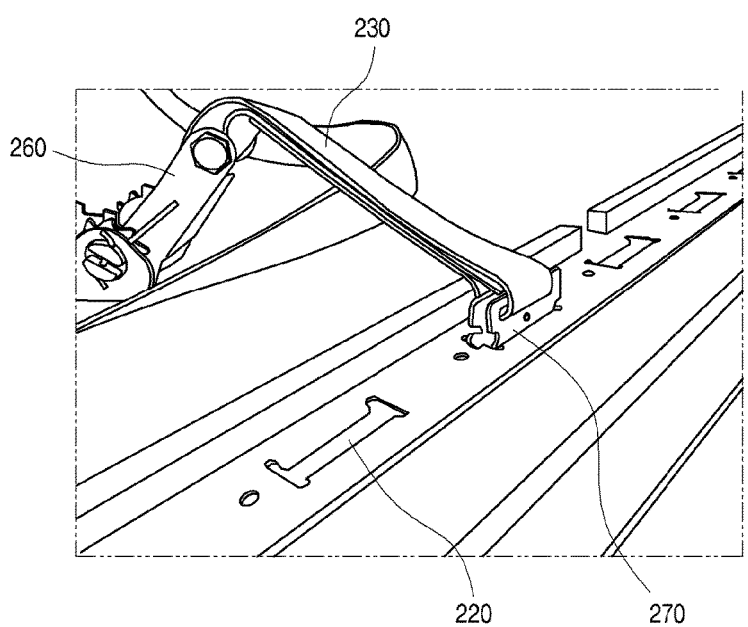
Figure 7:
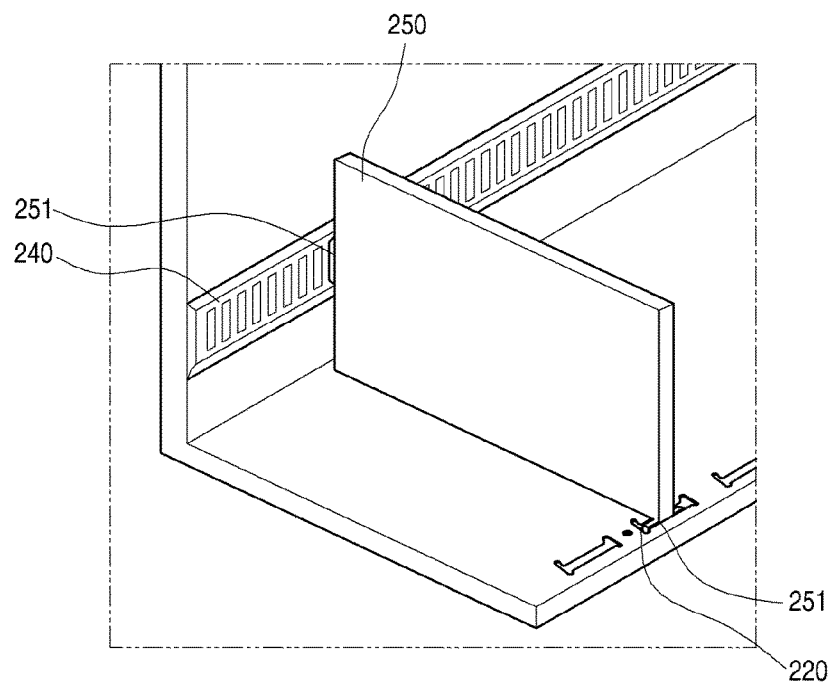
FIG. 7 is a view showing a mounting state of a support member according to the present invention.

Accordingly, securing arrangements for restricting movement of the airtight containers 20 may be provided in the first loading space 111 and the second loading space 112. As shown in FIGS. 5 and 6, the securing arrangements according to an embodiment of the present invention includes a first fixing groove 210, a second fixing groove 220, a tension member 230, a third fixing groove 240, and a support member 250.

A hook 270 at an end of a tension member 230 is inserted and firmly fixed in a first fixing groove 210 and a plurality of first fixing grooves 210 is formed with predetermined gaps at the upper portion of the partition plate 400 in the longitudinal direction to be able to flexibly select the positions and numbers of the tension members 230 to correspond to airtight containers 20 having various sizes.

A hook 270 at the other end of the tension member 230 is inserted and firmly fixed in the second fixing groove 220 and the second fixing grooves 220 are formed at the outer portion of the bottom of the body 100 with predetermined gaps corresponding to the first fixing grooves 210.

The tension member 230 is provided to restrict movement of an airtight container 20 in the width direction of the body 100, has the hooks 270 at both ends to be inserted in the first fixing groove 210 and the second fixing groove 22, and can be adjusted in length by a fastener 260.

The hooks 270 at both ends of the tension member 230 are inserted in the first fixing groove 210 and the second fixing groove 220 with an airtight container 20 loaded, and then the tension of the tension member 230 is adjusted through the fastener 260, whereby the tension member 230 prevents the airtight container 20 from moving.

A locking projection 251 on the side of the support member 250 is inserted and firmly fixed in the third fixing groove 240 and a plurality of third fixing grooves 240 is formed with predetermined gaps at the lower portion of the partition plate 400 in the longitudinal direction to be able to flexibly select the positions of the support member 250 to correspond to airtight containers 20 having various sizes.

The support member 250 is provided to restrict movement of an airtight container 20 in the longitudinal direction of the body 100 and has locking projections 251 on the side and the bottom to be inserted in the second fixing groove 220 and the third fixing groove 240.

The support members 250 may not be mounted if airtight containers 20 are loaded in close contact with each other. However, when airtight containers 20 are loaded with a predetermined gap therebetween without being in contact with each other or when a small number of airtight containers 20 are loaded, the support members 250 may be selectively mounted to restrict movement of the airtight containers 20 in the longitudinal direction of the body 100 (in the movement direction of the transportation vehicle).

Although the support members 250 according to the present invention are formed in a plate shape to effectively restrict movement of airtight containers 20, they may be formed in a bar shape or a belt shape, if necessary.

INDUSTRIAL APPLICABILITY

A gull wing door-type hazardous material container system according to the present invention includes: a body that has a loading space therein to load airtight containers keeping a hazardous material and is opened at both sides; a pair of gull wing doors that is independently operated to open/close both sides of the body; a partition plate that is longitudinally disposed in the body and divides the loading space into independent spaces of a first loading space and a second loading space; and cooling units that are disposed in the first loading space and the second loading space, respectively, to independently supply cold air, in which the first loading space and the second loading space can be independently sealed by the gull wing doors.

Accordingly, since the first loading space and the second loading space are divided to be independently opened/closed, it is possible to easily control temperature when transporting a hazardous material that is sensitive to temperature, and safe work is possible.

Further, even if only some of a plurality of hazardous materials is loaded or unloaded, the temperatures of the loading spaces opposite to each other are maintained without changing, so the container system can be used in various ways in the industrial field that deals with articles that require temperature control at predetermined levels in addition to hazardous materials.

The invention claimed is:

1. A gull wing door-type hazardous material container system comprising:
    a body that has a loading space therein to load airtight containers keeping a hazardous material and is opened at both sides;
    a pair of gull wing doors that are independently operated to open/close both sides of the body;
    a partition plate that is longitudinally disposed in the body and divides the loading space into independent spaces of a first loading space and a second loading space; and
    cooling units that are disposed in the first loading space and the second loading space, respectively, to independently supply cold air,
    wherein the first loading space and the second loading space can be independently sealed by the gull wing doors;
    wherein securing arrangements that restrict movement of the airtight containers are disposed in the first loading space and the second loading space;
    wherein the securing arrangements each include:
        a plurality of first fixing grooves formed with predetermined gaps at an upper portion of the partition plate in the longitudinal direction;
        a plurality of second fixing grooves formed with predetermined gaps at an outer portion of the bottom of the body in the longitudinal direction; and
        a tension member having an adjustable length, having hooks at both ends to be inserted in the first fixing grooves and the second fixing grooves, respectively, and restricting movement of the airtight container in the width direction of the body; and
    wherein the securing arrangements each include:
        a plurality of third fixing grooves formed with predetermined gaps at a lower portion of the partition plate in the longitudinal direction; and
        support members having locking projections on surfaces perpendicular to each other to be inserted in the second fixing grooves and the third fixing grooves, and restricting movement of the airtight container in the longitudinal direction of the body.

2. The system of claim 1, wherein the cooling units supply cold air from the upper portion of the body.

3. The system of claim 1, wherein a sub-door that selectively connects the first loading space and the second loading space is formed to be able to open/close at the partition plate.

* * * * *